E. M. BATES AND M. WHEELER.
PIN ATTACHED SNAP FASTENER.
APPLICATION FILED JAN. 15, 1921.

1,438,889. Patented Dec. 12, 1922.

Edith May Bates,
Mary Wheeler.
INVENTORS

BY Victor J. Evans
ATTORNEY

WITNESS: J. W. Ely.

Patented Dec. 12, 1922.

1,438,889

UNITED STATES PATENT OFFICE.

EDITH MAY BATES, OF NEW YORK, N. Y., AND MARY WHEELER, OF LOS ANGELES, CALIFORNIA.

PIN-ATTACHED SNAP FASTENER.

Application filed January 15, 1921. Serial No. 437,477.

*To all whom it may concern:*

Be it known that we, EDITH MAY BATES and MARY WHEELER, citizens of the United States, respectively, residing at New York and Los Angeles, respectively, in the counties of New York and Los Angeles, respectively, and States of New York and California, respectively, have invented new and useful Improvements in Pin-Attached Snap Fasteners, of which the following is a specification.

This invention relates to improvements in snap fasteners and particular to snap fasteners provided with pins for securing them to the garment and is an improvement on our snap fastener set forth in Patent #1,357,918 of November 2nd, 1920.

One of the principal objects of the invention is to make the device smaller and more compact.

Another object is to produce a device of this nature which shall be simple of construction, cheap to manufacture, and highly efficient for the purpose for which it is designed.

With these and other objects in view, the essential features of which are hereinafter fully described, are particularly pointed out in the appended claims, and are illustrated in the accompanying drawing, in which:—

Like characters of reference refer to like parts in all views.

Figure 1:
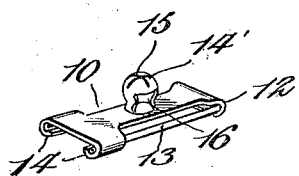
Figure 1 is an enlarged perspective view of the male element of one form of our invention.
Figure 2:
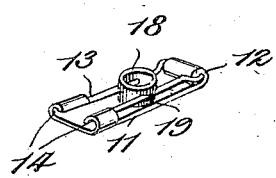
Figure 2 is a similar view of the corresponding female element.
Figure 3:
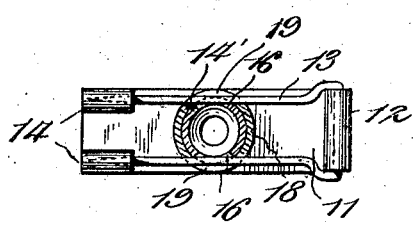
Figure 3 is a horizontal sectional view of the members in fastened position.
Figure 4:
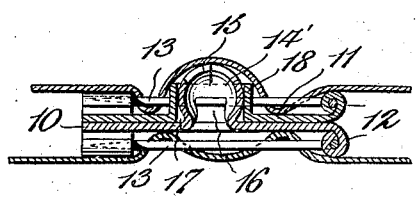
Figure 4 is a view showing the manner of attaching the pins to the material.

This invention contemplates the producing of a snap fastener, the male and female members of which may be respectively provided with pins for securing them to the materials which they are to fasten together, and the female member being provided with a spring member or members, either on the pin or otherwise, for co-acting with the extrusion on the male member for securing the same in closed condition.

Referring to the drawing more in detail, and in particular to Figures 1 to 4, 10 represents the male member of our improved snap fastener and 11 represents the female member, both of said members being flat plates having a bearing 12 rolled up at one end thereof. In each bearing 12 is pivotally seated the bight of a U-shaped pin or securing element 13, the legs of which tend to spring outwardly. The free pointed ends of the pins are adapted to be received by respective curled over ears 14 which form sheaths or protectors preventing catching of the points on the material or bands.

Rising from the face of the male member is the stud 14 which may or may not be slotted crosswise as at 15, and which is undercut at 16 lengthwise of the member 10 either on one or on both sides as desired.

Mounted on the pin side of the female member 11 and surrounding the aperture 17 therein is a low collar 18 provided with slots 19 into which the legs of the pin of the female member 11 project when the pin is in closed condition.

It will be readily understood that when the parts are in co-acting position, the legs of the pin on the female member will extend through the slots 19 in the collar 18 and into the slots 16. If a single leg pin is used instead of the double leg pin, of course only one slot 19 and one slot 16 will be provided. The pins are springy enough to permit the proper "snapping" and opening of the fastener, but are strong enough to withstand a reasonable amount of strain so as to prevent accidental unfastening.

Figure 5:
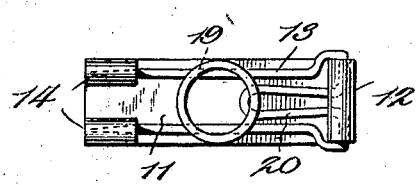
Figure 5 is a plan view of the female member in another form of the invention.

In Figure 5 is shown another form of the invention in which the central portion of the pin 13 is looped down as at 20 so as to form a spring element that may catch under the head of the stud 14. In this case the collar 18 may be dispensed with and one, two or three slots 16 provided as may be desired.

Figure 6:
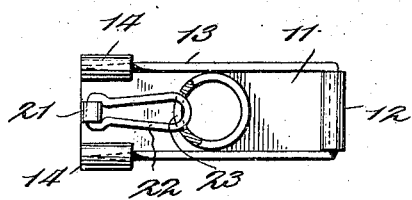
Figure 6 is a similar view of a third form of the invention.

In the form shown in Figure 6, an extra bearing 21 is turned up at the edge of the female member and a spring wire 22 projects therefrom through a slot 23 in the collar 18. The slots 19 are dispensed with, and only one slot 16 is provided to co-act with the wire 22.

Figure 7:
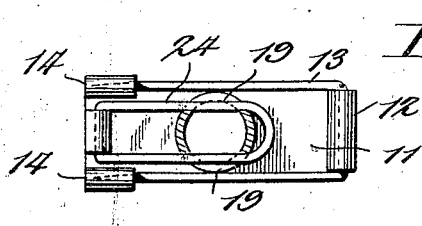
Figure 7 is a similar view of a fourth form of the invention.

In the form shown in Figure 7, the structure is similar to that in Figure 6 but the spring member 24 goes entirely around the collar 18 and extends into the two slots 18 therein.

While we have described what we deem to be the most desirable embodiments of our invention, it is obvious that the same is susceptible of embodiment in many forms without departing from the spirit of our invention; and we, therefore, do not limit ourselves to the exact details herein set forth nor to anything less than the whole of our invention limited only by the appended claims.

What is claimed is:—

1. A fastening device comprising a member having a socket and a slotted collar surrounding said socket, a second member having a stud adapted to enter said socket and collar, and a pin pivoted on said socket member and a cloth-piercing portion of which is adapted to extend through the slots in said collar for co-acting with said stud as and for the purpose set forth.

2. A fastening device comprising a member having a socket and a slotted collar surrounding said socket, a second member having a stud slotted in at its sides and adapted to enter said socket and collar, and a pin pivoted on said socket member and a cloth-piercing portion of which is adapted to extend through the slots in said collar and into the slots in said stud to secure the two members together.

3. A fastening device comprising a male member having lugs and a stud under cut at opposite sides, a female member formed with lugs and a socket and a collar surrounding said socket and undercut at opposite sides to correspond with said stud, and a pair of U-shaped pins each pivoted at its bight to one end of a respective one of said members and engageable at its free ends with said lugs, the pin of said female member being projected into the undercuts of said members when its free ends are co-operative with its lugs, the lugs forcing the pin into said undercuts, and said collar forcing the pin into engagement with its lugs.

In testimony whereof we have affixed our signatures.

EDITH MAY BATES.
MARY WHEELER.